(12) United States Patent
Grandjean et al.

(10) Patent No.: US 10,858,720 B2
(45) Date of Patent: Dec. 8, 2020

(54) METHOD FOR TREATNG A NITRIDED/NITROCARBURISED PART

(71) Applicant: H.E.F., Andrezieux Boutheon (FR)

(72) Inventors: Stéphan Grandjean, Saint Andre d'Apchon (FR); Fabrice Prost, Saint Etienne (FR)

(73) Assignee: H.E.F., Andrezieux Boutheon (FR)

(*) Notice: Subject to any disclaimer, the term of this patent is extended or adjusted under 35 U.S.C. 154(b) by 920 days.

(21) Appl. No.: 15/327,116

(22) PCT Filed: Jul. 16, 2015

(86) PCT No.: PCT/FR2015/051944
§ 371 (c)(1),
(2) Date: Jan. 18, 2017

(87) PCT Pub. No.: WO2016/012697
PCT Pub. Date: Jan. 28, 2016

(65) Prior Publication Data
US 2017/0152582 A1    Jun. 1, 2017

(30) Foreign Application Priority Data

Jul. 21, 2014    (FR) .................................... 14 57028

(51) Int. Cl.
*C21D 10/00*    (2006.01)
*C23C 8/28*    (2006.01)
(Continued)

(52) U.S. Cl.
CPC ............ *C21D 10/005* (2013.01); *B23K 9/167* (2013.01); *B23K 9/23* (2013.01); *B23K 9/235* (2013.01);
(Continued)

(58) Field of Classification Search
CPC ........ C21D 10/00; C21D 10/005; C23C 8/20; C23C 8/24; C23C 8/26; C23C 8/28;
(Continued)

(56) References Cited

U.S. PATENT DOCUMENTS

| 2007/0102068 A1 | 5/2007 | Taniguchi et al. |
| 2007/0116889 A1 | 5/2007 | Lineton et al. |

(Continued)

FOREIGN PATENT DOCUMENTS

| EP | 0696648 A1 | 2/1996 |
| EP | 2460906 A1 | 6/2012 |
| WO | 2013050855 A2 | 4/2013 |

OTHER PUBLICATIONS

International Search Report and Written Opinion issued in PCT/GR2015/051944, dated Nov. 26, 2015.
(Continued)

*Primary Examiner* — Colleen P Dunn
*Assistant Examiner* — Anthony M Liang
(74) *Attorney, Agent, or Firm* — Heslin Rothenberg Farley & Mesiti P.C.

(57) ABSTRACT

In a method of treating a nitrided/nitrocarburized workpiece, at least a portion of the workpiece is subjected to a first step in which at least one laser beam is moved in at least one pass over the portion, until the surface layer of the portion is transformed in part or in full, and until the distribution of the nitrogen concentration in the diffusion zone is modified. In a second step at least one laser beam is moved in at least one pass over said portion so as to enable the nitrogen concentration in the underlying diffusion layer to be reduced.

8 Claims, 4 Drawing Sheets

Figure 1:
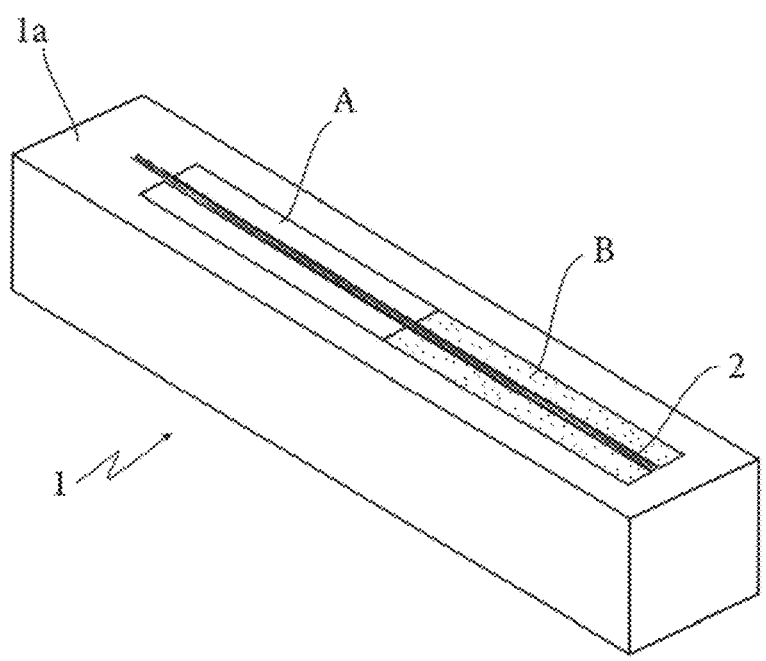

(51) Int. Cl.
*B23K 9/235* (2006.01)
*B23K 9/167* (2006.01)
*B23K 26/21* (2014.01)
*C23C 8/80* (2006.01)
*B23K 26/32* (2014.01)
*B23K 9/23* (2006.01)
*B23K 26/60* (2014.01)
*B23K 26/352* (2014.01)
*C23C 8/26* (2006.01)
*B23K 103/04* (2006.01)

(52) U.S. Cl.
CPC .............. *B23K 26/21* (2015.10); *B23K 26/32* (2013.01); *B23K 26/352* (2015.10); *B23K 26/60* (2015.10); *C23C 8/26* (2013.01); *C23C 8/28* (2013.01); *C23C 8/80* (2013.01); *B23K 2103/04* (2018.08)

(58) Field of Classification Search
CPC ...... C23C 8/80; B23K 2103/04; B23K 26/21; B23K 26/32; B23K 26/352; B23K 26/60; B23K 26/0006; B23K 9/167; B23K 9/23; B23K 9/235
See application file for complete search history.

(56) References Cited

U.S. PATENT DOCUMENTS

2010/0051141 A1  3/2010  Bhambri
2013/0087534 A1  4/2013  Denney

OTHER PUBLICATIONS

Gu et al., "Laser Beam Welding of Nitride Steel Components," Physics Procedia, 12:40-45 (2011).

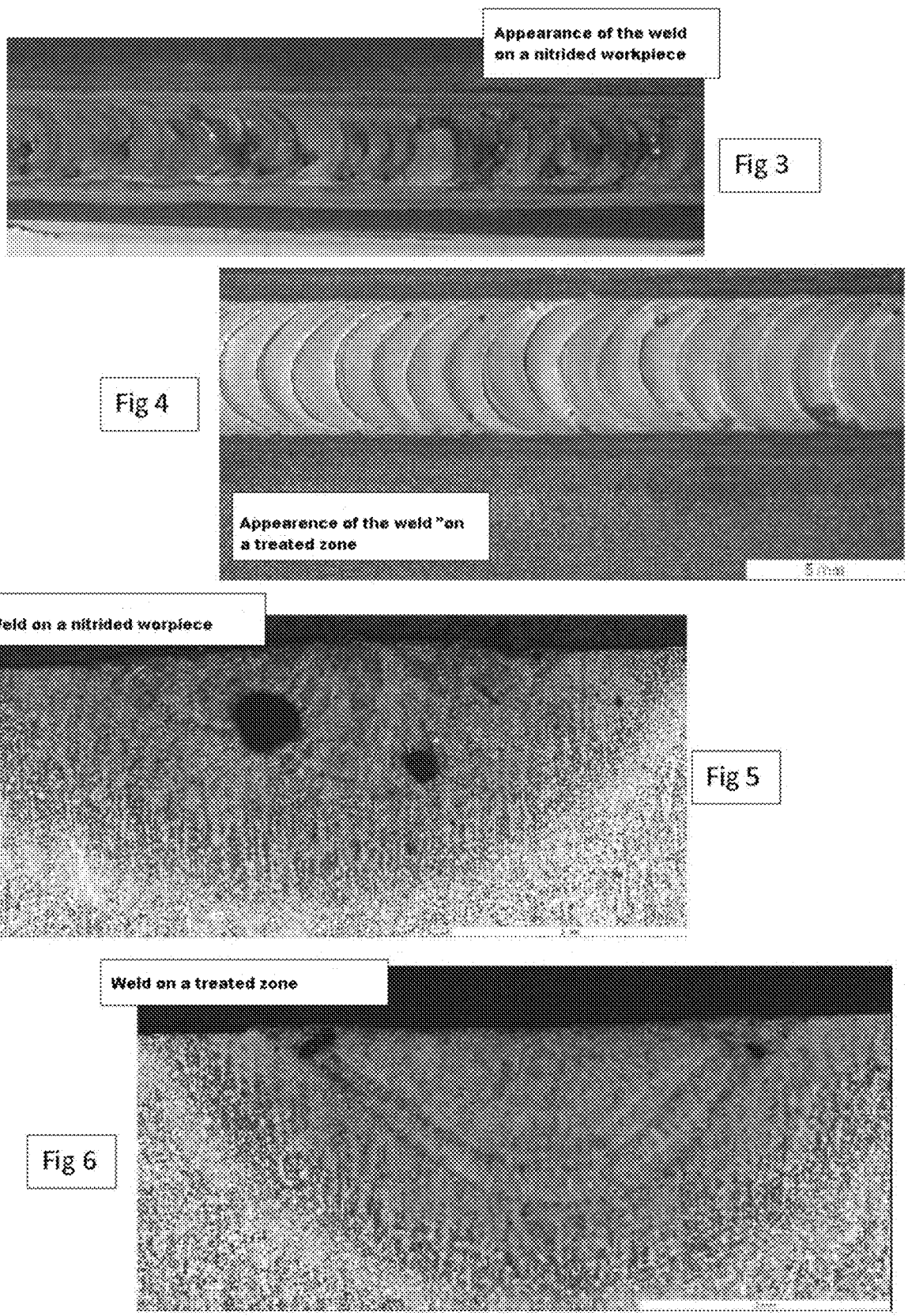

METHOD FOR TREATNG A NITRIDED/NITROCARBURISED PART

CROSS REFERENCE TO RELATED APPLICATIONS

This application is the National Phase filing under 35 U.S.C. § 371 of International Application No. PCT/FR2015/051944, filed on Jul. 16, 2015, and published on Jan. 28, 2016, as WO/2016/012697 A1, and claims priority to French Application No. 1457028, filed on Jul. 21, 2014. The contents of each of the prior applications are hereby incorporated by reference herein in their entirety.

BACKGROUND ART

The invention relates to a method of treating a nitrided workpiece.

As is very well known to the person skilled in the art, nitriding/nitrocarburizing is diffusing nitrogen into the surface of a metal workpiece that is generally previously treated, e.g. by quenching and tempering. Nitrogen being inserted and nitrides being formed with the steel alloy elements cause surface hardening that procures the desired properties, e.g. surface hardness of in the range 750 Vickers hardness (HV) to 1100 HV for most steels.

Various methods can be used for performing a nitriding operation per se, among which it is possible to mention gas, low-pressure, salt-bath, and ion nitriding, this list not being exhaustive. Ion nitriding is performed in an oven in a vacuum by means of a controlled flow of active gas that is dissociated by plasma.

Essentially, the nitrided layer has, at its surface, a "combination layer" or a "white layer" in which the nitrogen can be combined in the form of iron nitride that is of very high hardness in order to facilitate friction while also increasing resistance to wear and to seizing Under the combination layer, which can be of thickness lying approximately in the range 5 micrometers (m) to 25 μm, an underlying diffusion layer appears that procures fatigue strength and that reinforces wear resistance. The composition and the thickness of the layers depend on the grade of the steel in question and on the treatment parameters.

Nitriding is particularly widely used for increasing the resistance of a steel workpiece to fatigue, to wear, and to seizing however, tests have shown that nitrogen is particularly detrimental to weldability, because porosity and blowhole defects appear in the surface layer. Thus, tests performed with Tungsten Inert Gas (TIG) welding and with Laser Beam Welding (LBW) on XC 48 workpieces previously subjected to a nitriding operation showed that nitriding strongly influenced the welding operations regardless of the method used. The weld beads were uneven with large blow holes appearing in large numbers.

Thus, in order for nitrided or nitrocarburized workpieces to be welded under good conditions, it appeared important to transform the surface layer at the portion of the workpiece where the weld is to be formed.

Various solutions, in particular stopping-off or resist solutions, have been proposed for forming a weld on a workpiece that is to be nitrided.

For example, it has been proposed to perform mechanical masking that generally takes place in two stages, one of which is performed upstream from the nitriding/nitrocarburizing treatment and involves positioning a mask, the other stage, performed downstream from said treatment, involving removing said mask. Such a method is difficult to implement on complex shapes. The wear and the cost of the masks and the cost of the upstream mounting and downstream removal operations are also significant.

It has also been proposed, also for nitriding and nitrocarburizing, to provide masking with copper-based paint that constitutes an effective barrier to nitrogen or carbon compounds. However, such a method is costly, relatively lengthy to implement in view of the drying time necessary for the treatment, and then for removing the paint. It has also been observed that residual stresses can be generated and can cause deformations. It should also be noted that this type of solution is possible only for gas nitriding and/or ion nitriding, and is not possible for salt-bath nitriding.

It is conceivable to perform machining operations of the turning and milling type on the zone of the combination layer that is to be transformed. However, such operations are difficult to apply to complex zones or multiple zones.

It is also observed that merely mechanically removing the combination layer does not make it possible to modify the concentration of nitrogen in the diffusion zone, and thus to guarantee good welding quality.

Reference can also be made to the teaching of Document WO 2013/050855 that relates to a cleaning system using a high-energy heat source for removing a surface coating from a substrate with a view to performing welding operations.

That document does not relate to treating a nitrided workpiece and does not raise the problem of transforming at least a portion of the combination layer in order to modify the structure of the workpiece.

An object of the invention is to remedy those drawbacks in a simple, safe, effective, and rational manne.

The problem that the invention proposes to solve is to make it easy for any portion of a nitrided/nitrocarburized workpiece to be made compatible with welding by modifying the structure of the workpiece at a zone of the surface layer where the welding operation per se is to be performed by any known and appropriate means.

In the description below, the term "surface layer" is used to mean at least the combination layer, considered in full or in part, and possibly including, also in full or in part, the diffusion layer.

To solve such a problem, the invention provides a method of treating a nitrided/nitrocarburized workpiece, which method consists in subjecting at least a portion of the workpiece to a first step in which at least one laser beam is moved in at least one pass over said portion, until the surface layer of the portion in question is transformed in part or in full, and until the distribution of the nitrogen concentration in the diffusion zone is modified.

BRIEF SUMMARY OF THE INVENTION

It results from these characteristics that the treatment method makes it possible, in a first step, to transform the surface layer and to modify the distribution of the nitrogen concentration in the diffusion zone, this first step being sufficient for making the treated zone compatible with welding.

Advantageous results were obtained when, for the first step, a plurality of passes were made with an inter-line space between the passes that lay in the range 0.01 millimeters (mm) to 0.05 mm. The inter-line space is advantageously 0.02 mm.

Advantageously, to solve the problem of transforming the surface layer and of modifying the distribution of the nitrogen concentration in the diffusion layer, a 20-watt (W) fiber and pulse laser is used that is set at about 20 kilohertz (kHz) and at 50% of its power, defocused by 5 mm and subjected to a speed of advance of about 300 millimeters per second (mm/s).

Starting from this basic characteristic, it has appeared that it is also possible to make a significant modification in the nitrogen concentration in the diffusion layer. For this purpose, the portion treated by laser for, in particular, transforming the surface layer is subjected to a second step in which at least the laser beam(s) is/are moved in at least one pass over said portion so as to enable the nitrogen concentration in the underlying diffusion layer to be reduced.

To solve the problem of modifying the distribution of the nitrogen concentration while reducing the nitrogen content in the diffusion layer, for this second step, the 20-W fiber and pulse laser is set at about 200 kHz and at 100% of its power, defocused by 5 mm and subjected to a speed of advance lying in the range 1 mm/s to 10 mm/s.

It results from these characteristics that the invention also provides a method of welding a nitrided/nitrocarburized workpiece, which method consists in:

subjecting at least a portion of the workpiece to a first step in which at least one laser beam is moved in at least one pass over said portion, until the surface layer of the portion in question is transformed in part or in full, and until the distribution of the nitrogen concentration in the diffusion zone is modified; and forming a weld at the treated portion of the workpiece.

In another implementation, the welding method consists in:

subjecting at least a portion of the workpiece to a first step in which at least one laser beam is moved in at least one pass over said portion, until the surface layer of the portion in question is transformed in part or in full, and until the distribution of the nitrogen concentration in the diffusion zone is modified;

subjecting the portion at least treated by laser for transforming the surface layer to a second step in which at least one laser beam is moved in at least one pass over said portion so as to enable the nitrogen concentration in the underlying diffusion layer to be reduced; and forming a weld at the treated portion of the workpiece.

BRIEF DESCRIPTION OF THE DRAWING FIGURES

Figure 2:
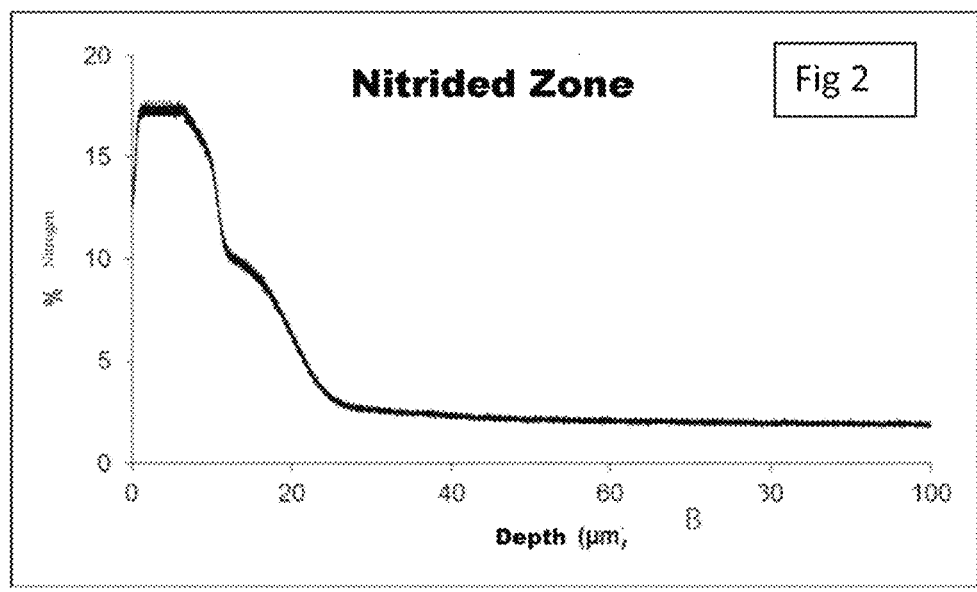
Figure 2A:
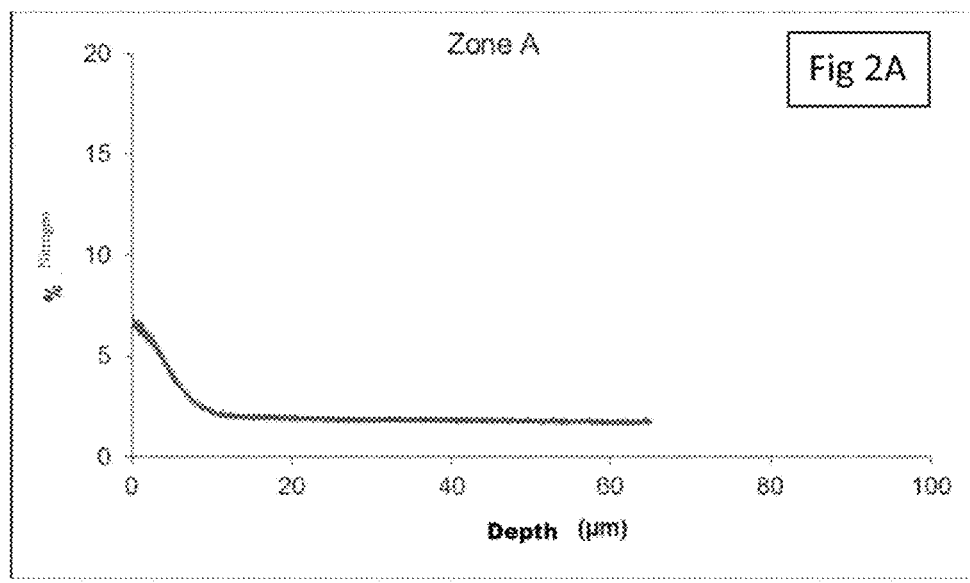
Figure 2B:
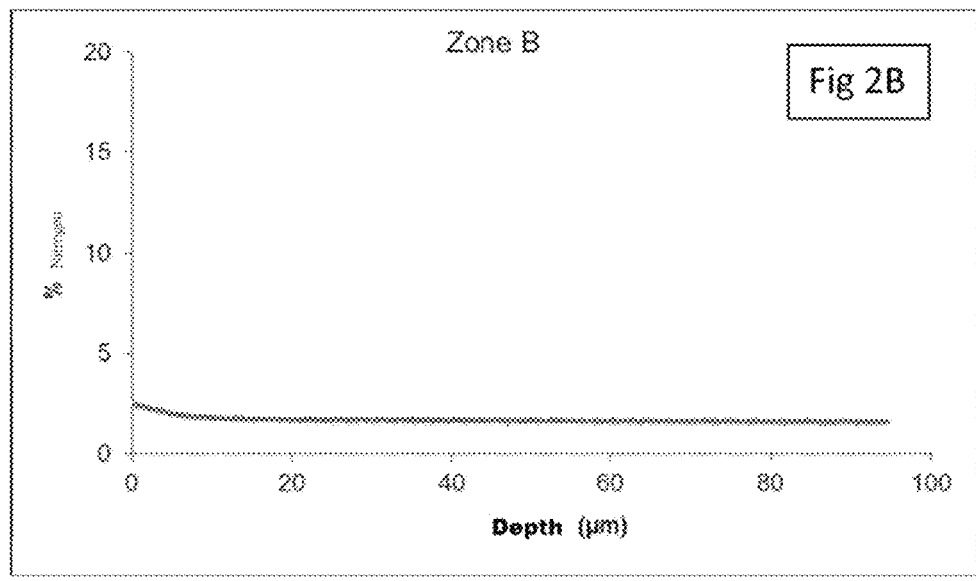
Figure 7:
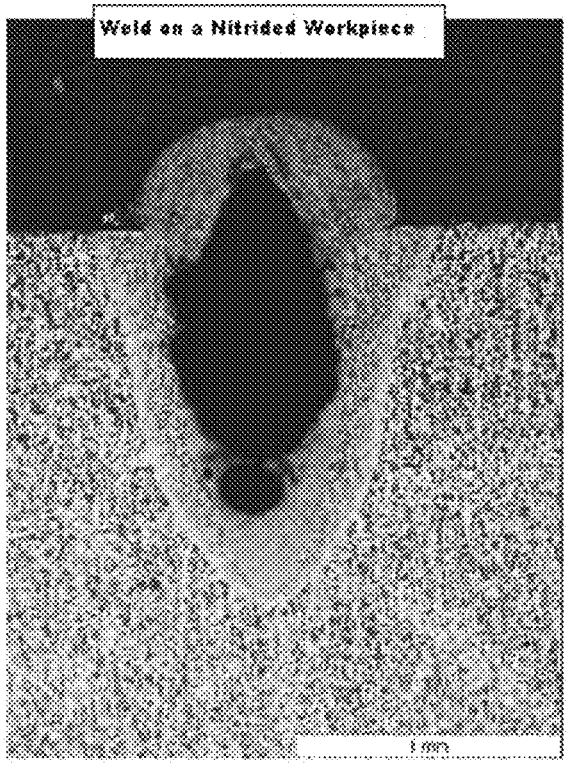
Figure 8:
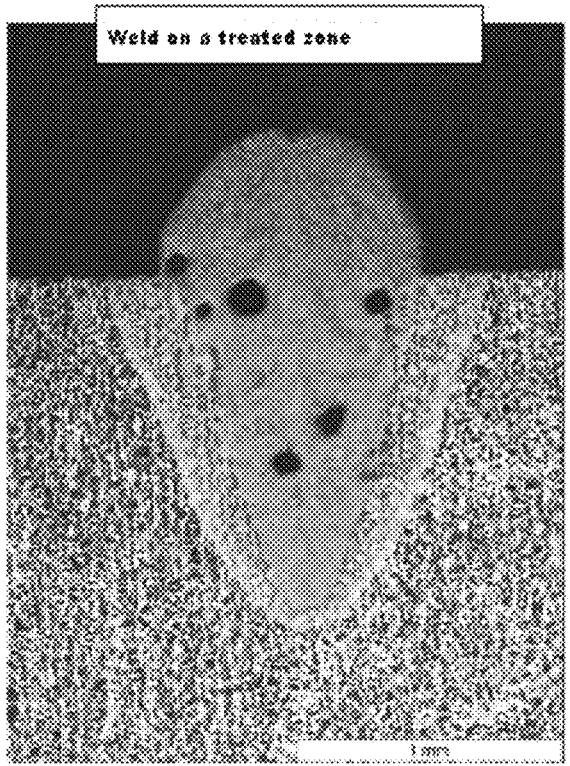

The invention is described in more detail below with reference to the figures of the accompanying drawings, in which:

FIG. 1 shows a sample of a workpiece having its top face nitrided and having a zone (A) treated by implementing the first step of the method of the invention, and a zone (B) treated by implementing the first and second steps of the method of the invention;

FIGS. 2, 2A, and 2B give curves showing nitrogen percentage relative to depth at the nitrided zone of the workpiece (FIG. 2), of the zone (A) treated by implementing the first step (FIG. 2A), and of the zone (B) treated by implementing both of the steps of the method (FIG. 2B);

FIGS. 3 and 4 show the appearance of a TIG weld, one for a nitrided surface (FIG. 3) and the other for a nitrided surface having a zone that has been treated by implementing the first step of the method (FIG. 4);

FIGS. 5 and 6 are endoscopic views showing a TIG weld, one for a nitrided surface (FIG. 5) and the other for a nitrided surface having a zone that has been treated by implementing the first step of the method (FIG. 6); and FIGS. 7 and 8 are endoscopic views showing a laser weld, one for a nitrided surface (FIG. 7) and the other for a nitrided surface having a zone that has been treated by implementing the first step of the method (FIG. 8).

DETAILED DESCRIPTION

FIG. 1 shows a non-limiting example of a workpiece designated overall by reference 1, and having a nitrided face (1a). On the nitrided face (1a), a zone (A) has been treated by implementing a first step of the method of the invention and a zone (B) has been treated by implementing the first step and the second step of the treatment method. A weld bead (2) has been formed over the entire length of the workpiece (1) both at the nitrided zone (1a) and at the zones treated by implementing the method of the invention in one or two steps, characterized respectively by zone A and by zone B.

It is recalled that an object of the invention is to modify the structure of the workpiece (1) by transforming the surface layer in order to enable any type of welding to be performed at the zone treated in this way. Thus, a zone (A) is subjected to a first step in which at least one laser beam is moved in at least one pass until the surface layer is completely removed from said zone of the nitrided face (1a). Advantageous results were obtained when a plurality of passes were made with an inter-line space between the passes that lay in the range 0.01 mm to 0.05 mm, and preferably with an inter-line space of 0.02 mm. This method is implemented by means of a 20-W fiber and pulse laser set at about 20 kHz and at 50% of its power, defocused by 5 mm and subjected to a speed of advance of about 300 mm/s.

For TIG welding, reference is made to the curves of FIGS. 2, 2A, and 2B and to the metallographic sections of FIGS. 5 and 6. FIG. 6 shows a TIG weld at a zone (A) treated by implementing the first step of the treatment method, to be compared with FIG. 5 that shows a TIG weld at the non-treated nitrided surface. For laser welding, reference is made to the curves of FIGS. 2, 2A, and 2B and to the metallographic sections of FIGS. 7 and 8. FIG. 8 shows a laser weld at a zone (A) treated by implementing the first step of the treatment method, to be compared with FIG. 7 that shows a laser weld at the non-treated nitrided surface.

A zone (B) of the workpiece (1) is previously treated by implementing the first step of the method of the invention as indicated above.

This zone is then subjected to a second step in which the laser beam is moved in at least one pass so as to make it possible to modify the distribution of the nitrogen concentration at said zone in the underlying diffusion layer. For this second step, the same 20-W fiber and pulse laser is used with different settings.

Thus, the laser is set at about 200 kHz and at 100% of its power defocused by 5 mm and subjected to a speed of advance lying in the range 1 mm/s to 10 mm/s. This second step is performed in a single pass.

Reference is made to the curve in FIG. 2B that shows the additional reduction in the nitrogen content between the two steps of the method. This significant loss of nitrogen is difficult to achieve with the settings of the first step.

These various tests show that the weld over a nitrided surface generated a non-uniform disturbed appearance having surface holes (FIG. 3), which were through blow holes (FIG. 5).

These metallographic sections show that the invention gives good-performance results for TIG welding, and also, to a lesser extent, for laser welding.

By associating a second step with the method, it was also observed that the distribution of the nitrogen concentration was modified. This modification was characterized by a reduction in the nitrogen content in the underlying diffusion layer.

It results from the characteristics of the method of the invention that the treatment modifies the structure of the workpiece by transforming the surface layer and making it possible, as a result, to weld a nitrided workpiece.

This laser operation is relatively inexpensive because a single operation suffices and makes it possible to treat all types of workpieces with very high accuracy, including specific zones or complex shapes.

To sum up, and considering the fact that nitriding is not compatible with a welding operation, the treatment method makes it possible, in a first step, to transform the surface layer and to modify the distribution of the nitrogen concentration in the diffusion zone. Good-performance results were achieved not only for TIG welding but also for laser welding. This first step is sufficient to make the zone compatible with welding.

In a second step of the treatment method, it is possible to modify the distribution of the nitrogen concentration while reducing the nitrogen content in the diffusion layer. Surprisingly and unexpectedly, it appeared that a reduction in the nitrogen concentration in the diffusion zone gave a reverse result, namely that the welding was of poorer quality. This reduction in the nitrogen content in the diffusion layer may be important for certain applications, e.g. for reducing the fragility of workpieces.

The invention claimed is:

1. A method of treating a nitrided or nitrocarburized workpiece, comprising:
   subjecting at least a portion of the workpiece to a first step in which at least one laser beam is moved in at least one pass over said at least a portion, until a surface layer of the at least a portion is transformed such that a distribution of nitrogen concentration in an underlying diffusion zone is modified; and
   subjecting the at least a portion to a second step in which at least one laser beam is moved in at least one pass over said at least a portion, thereby reducing the nitrogen concentration in the underlying diffusion zone.

2. The method according to claim 1, wherein, for the first step, a plurality of passes are made with an inter-line space between the passes that lies in the range 0.01 mm to 0.05 mm.

3. The method according to claim 2, wherein the inter-line space is 0.02 mm.

4. The method according to claim 1, wherein, for the first step, a 20-W fiber and pulse laser is used that is set at 20 kHz and at 50% of its power, defocused by 5 mm and subjected to a speed of advance of 300 mm/second.

5. The method according to claim 1, wherein, for the second step, a 20-W fiber and pulse laser is used that is set at 200 kHz and at 100% of its power, defocused by 5 mm and subjected to a speed of advance in the range 1 mm/second to 10 mm/second.

6. The method according to claim 1, wherein, for the second step, only a single pass is performed.

7. A method of welding a nitrided or nitrocarburized workpiece, comprising:
   subjecting at least a portion of the workpiece to a first step in which at least one laser beam is moved in at least one pass over said at least a portion, until a surface layer of the at least a portion is transformed such that a distribution of nitrogen concentration in an underlying diffusion zone is modified;
   subjecting the at least a portion to a second step in which at least one laser beam is moved in at least one pass over said at least a portion, thereby reducing the nitrogen concentration in the underlying diffusion zone; and
   forming a weld at the treated at least a portion of the workpiece.

8. The method according to claim 7, wherein the weld is formed by Tungsten Inert Gas welding.

* * * * *